June 29, 1943.  W. R. DAVIS  2,322,832
POWER TRANSMISSION DRIVE ELEMENT
Filed May 21, 1942
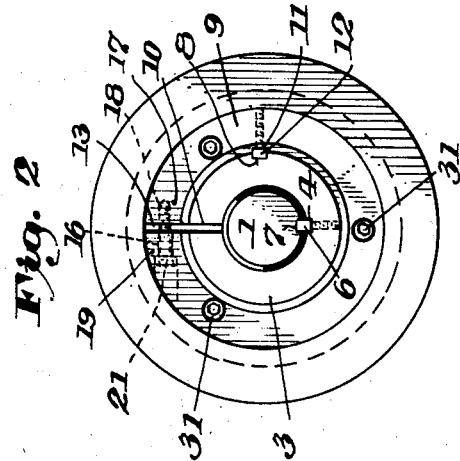
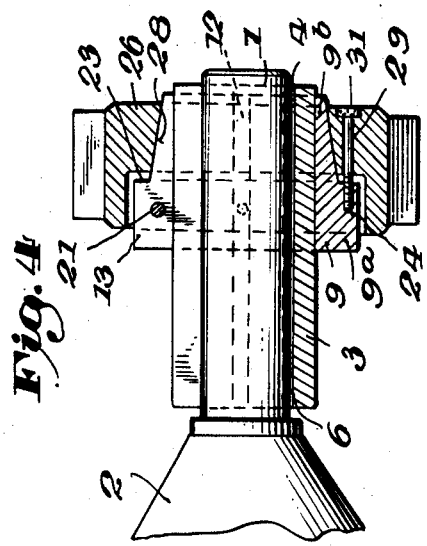
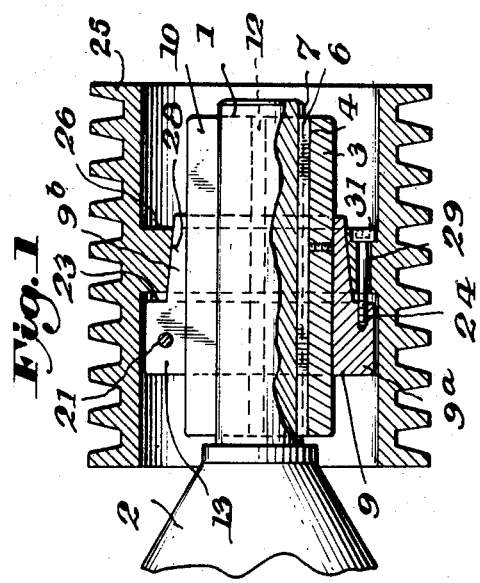
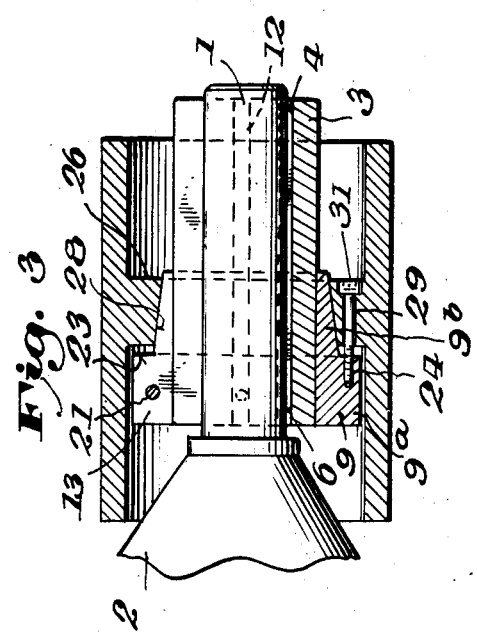
Inventor,
Willard R. Davis
By Sommers & Young
Attorneys Patented June 29, 1943

2,322,832

UNITED STATES PATENT OFFICE 2,322,832

POWER TRANSMISSION DRIVE ELEMENT

Willard R. Davis, Houston, Tex., assignor to T. B. Wood's Sons Company, Chambersburg, Pa., a corporation of Pennsylvania Application May 21, 1942, Serial No. 443,962

9 Claims. (Cl. 287—52.09)

This invention relates to rotary power transmission drive elements, such as sheaves, pulleys, gears, or the like, and particularly to means for mounting such elements on a shaft. The problem to be solved by the present invention is encountered particularly in taking off power from the shaft of an engine closely adjacent the engine housing where longitudinal adjustment of the drive element is limited, or applying power to a shaft having similarly restricted adjustment possibilities. It is essential for proper power transmission through belts or gears that the elements involved shall be properly adjusted to positions substantially opposite each other.

The present invention has for an object to provide a rotary power transmission element which can be secured on a shaft at substantially any location which happens to be available and the engaging surface of which can be adjusted axially of the shaft to the proper position for operation without moving the portion of the element engaging the shaft.

A further object of this invention is to provide a rotary transmission element which is capable of being compressed upon a shaft so as to be precisely centered with respect thereto, will not extend beyond the end of the shaft, and yet allows adjustment of the driving face in either axial direction.

In the accompanying drawing, several embodiments of the invention are shown applied to the stub drive shaft of an engine for illustrating an advantageous use of the invention.

Fig. 1 is a longitudinal sectional view of a sheave adapted for use with a V-belt drive, the position of adjustment being substantially the middle position;

Fig. 2 is an end view of the V-belt sheave of Fig. 1 taken from the left;

Fig. 3 is a longitudinal sectional view of a flat belt sheave, the position of adjustment being toward the left; and Fig. 4 is a longitudinal sectional view of a gear mounted on a stub shaft, the position of adjustment being toward the right.

In Fig. 1, numeral 1 indicates a stub shaft of an engine, a portion of the casing of which is shown at 2. In practice, the length of the shaft must be restricted due to the possibility of lateral whip or bending occurring if a transverse pressure is applied at a position too distant from the engine casing. Numeral 3 indicates a sleeve which may be provided with a keyway 4 which accommodates a key 6 which also extends into keyway 7 in shaft 1 so as to positively lock the sleeve against turning relative to the shaft. The sleeve 3 at its side opposite the keyway is provided with a split or gap 10 whereby, when sufficient pressure is applied, it will be contracted and frictionally engage the shaft. Accordingly, the transmission of force between the shaft and sleeve is through this frictional engagement rather than through the key and keyways, and this is preferable because no relative motion can occur and eventual wear is avoided, whereas transmission through the key would eventually result in lost motion and increasing rate of wear. Furthermore, the contraction of the sleeve results in precise centering of the sleeve relative to the axis of the shaft.

Outside the sleeve is a collar 9 which is split at 13 and is provided with a keyway 11 for key 12 which also engages in keyway 8 on the outside of sleeve 3. The collar 9 is provided with a bore 16 extending through the edges of the split 13, and on one side 17 the bore is provided with screw threads 18, the other side 19 being of larger diameter than the threaded side so as to allow the threaded end of a bolt 21 to freely pass through to engage with threads 18 of the threaded side of the bore. Upon tightening bolt 21, the collar 9 is contracted upon sleeve 3 which in turn is contracted upon shaft 1, both of these elements then receiving the drive through frictional engagement. It will be observed that the length of collar 9 is considerably less than the length of sleeve 3 whereby it is possible to move the collar in either direction for the purpose of obtaining proper alinement with a laterally located transmission element with which driving connection is desired. In order to provide a satisfactory frictional engagement between certain elements, for instance, the shaft and the sleeve, or the sleeve and the collar, without overstressing the surfaces involved with resulting tendency to slip, it is necessary to insure that the areas of frictional engagement are sufficient. In the case of the shaft and the sleeve, the measure of the frictional engagement area is the perimeter of the shaft times the length of the sleeve. Similarly, the measure of frictional engagement area of the sleeve and collar is the perimeter of the sleeve times the length of the collar. It will be noted that if the perimeter of the sleeve were smaller, then the length of the collar would have to be longer in order to have the same frictional engagement area. Furthermore, for the purposes of illustration, if the sleeve were omitted and the collar mounted directly on the shaft, then the collar would have to be as long as the sleeve would have been, if used, and this would allow no adjustment in the axial direction. Incidentally, it may be mentioned that if the element which engages the shaft should be moved to a position where it extended beyond the end of the shaft, the transmission element would soon work loose in service.

Since the perimeter of the sleeve 3 is considerably greater than that of the shaft 1, the length of the collar 9 can be considerably shorter than would be necessary if it were mounted directly on the shaft and still have sufficient frictional engagement area.

Another condition which should be given consideration in building a rotary transmission element of this kind is the tendency of the element to overturn sidewise in case it should be unevenly loaded. To guard against this, the length of the hub should be made sufficient to counteract the moments of force tending to overturn the element. The length of hub required depends on the difference in diameters of the hub and the periphery of the element. Assuming that to overcome this tendency toward overturning it is required that the hub be as long as sleeve 3 for a shaft the size of shaft 1, then if collar 9 were mounted directly on shaft 1, the collar would have to be equal in length to sleeve 3, in which case no axial adjustment would be possible. However, since, according to the invention, the collar is mounted on the outside of the sleeve and the overturning forces are applied through a shorter arm, then the overturning moments are smaller and the collar 9 can be shorter than sleeve 3 whereby it can be adjusted along the sleeve for the purposes previously mentioned.

The collar 9 may possibly be considered as composed of two parts, a ring portion 9a and a cam portion 9b which tapers toward the end. These portions 9a and 9b are preferably divided by an abrupt shoulder 23. The ring portion is provided with several screw-threaded bores 24 entering from the shoulder. The driving face of the element, which in Fig. 1 is shown as a sheave 25 for V-belts, extends around a disc-like portion 26 which has an inner bore 28 provided with a taper equal and opposite to that of the cam portion 9b of the collar 9. Also, this disc-like portion 26 is provided with holes 29 corresponding with bores 24 only of greater diameter. Bolts 31 pass through holes 29 and are screw-threaded into bores 24. The disc-like portion 26 of the sheave is drawn tightly onto the cam portion 9b, thus precisely centering the sheave and at the same time increasing the inward pressure on the collar and sleeve, and also providing a frictional engagement driving area between the sheave disc and the collar so that the drive is transmitted primarily through friction from the shaft all the way out to the sheave rim.

Fig. 3 of the drawing shows that, instead of a sheave rim having grooves for V-belts, the rim may be plain for use with flat belts. Additionally, Fig. 3 illustrates a position of adjustment of the rim to the left, an adjustment which cannot be obtained with other mountings.

Fig. 4 shows an embodiment in which gear teeth are the transmission elements, and this figure illustrates the collar moved to a position of adjustment toward the right.

It will thus be seen that by the present construction it is possible to make axial adjustments of the position of a sheave or the like without extending the shaft-engaging member beyond the end of the shaft and to always keep the frictional driving areas and the factors opposing overturning moments within the requirements for avoiding trouble in operation.

I claim:

1. In rotary power transmission mechanism of the class described, a rotary shaft, a split sleeve on said shaft adapted to frictionally drivingly engage the shaft when contracted thereon, a split collar on said shaft, means for contracting said collar on said sleeve whereby said sleeve is contracted and clamped on said shaft, and a driving rim secured on said collar, said collar being of less axial length than the sleeve whereby the axial position of the rim can be adjusted by moving the collar and rim axially along the sleeve to the desired position.

2. A sheave comprising a rim having a disc-like inner flange, a longitudinally split collar, means for drawing the edges of the split collar together, means for securing the rim flange to said collar, a longitudinally split sleeve inside said collar, and a shaft within said sleeve, the collar serving to clamp the sleeve on the shaft, the area of frictional driving contact between the shaft and sleeve and between the collar and sleeve being substantially proportional to the length of the respective arms through which the transmitted force acts on said surfaces from the outer face of the rim, whereby the length of the collar is considerably less than the sleeve and the collar may be adjusted along the sleeve to properly position the rim.

3. A sheave comprising a rim, a longitudinally split collar, means for drawing the edges of the collar toward each other, and a longitudinally split sleeve within said collar, the respective lengths of said collar and sleeve being proportional to the distances of their inner surfaces from the outer surface of the sheave, and said lengths being sufficient to overcome probable lateral overturning forces applied to the rim acting through said distances respectively, whereby the length of the collar is considerably less than the sleeve and the collar can be moved longitudinally on the sleeve to adjust the position of the collar and sheave.

4. In rotary power transmission mechanism of the class described, a rotary shaft, a split sleeve on said shaft adapted to frictionally drivingly engage the shaft when contracted thereon, a split collar on said shaft, means for contracting said collar on said sleeve and said sleeve on said shaft, a driving rim secured on said collar, said collar being of less axial length than the sleeve whereby the axial position of the rim can be adjusted by moving the collar axially along the sleeve to the desired position, said collar having a tapered end portion, said rim having an inner disc-like flange provided with a central opening, the edge of said opening engaging against the tapered portion of said collar, and means for pressing the flange on said tapered portion to center the rim with respect to the axis of rotation and aid in pressing the collar on said sleeve and the sleeve on the shaft.

5. In rotary power transmission mechanism of the class described, a rotary shaft, a split sleeve on said shaft adapted to frictionally drivingly engage the shaft when contracted thereon, a split collar on said shaft, means for contracting said collar on said sleeve and said sleeve on said shaft, a driving rim secured on said collar, said collar being of less axial length than the sleeve whereby the axial position of the rim can be adjusted by moving the collar axially along the sleeve to the desired position, said collar having a tapered end portion, said rim having an inner disc-like flange provided with a central opening, the edge of said opening engaging against the tapered portion of said collar, said collar also having a ring portion extending outwardly from the larger end of the tapered portion, and means engaging said ring portion for drawing the flange of the rim on said tapered portion to center the rim with respect to the axis of rotation and aid in pressing the collar on said sleeve and the sleeve on the shaft.

6. In rotary power transmission mechanism of the class described, a rotary shaft, a split sleeve on said shaft adapted to frictionally drivingly engage the shaft when contracted thereon, a split collar on said shaft, means for contracting said collar on said sleeve and said sleeve on said shaft, a driving rim secured on said collar and having a peripheral V-shaped groove for accommodating a V-shaped drive belt, said collar being of less axial length than the sleeve whereby the axial position of the rim can be adjusted by moving the collar axially along the sleeve to the desired position, said collar having a tapered end portion, said rim having an inner disc-like flange provided with a central opening, the edge of said opening engaging against the tapered portion of said collar, and means for pressing the flange on said tapered portion to center the rim with respect to the axis of rotation and aid in pressing the collar on said sleeve and the sleeve on the shaft.

7. In rotary power transmission mechanism or the class described, a rotary shaft, a split sleeve on said shaft adapted to frictionally drivingly engage the shaft when contracted thereon, a split collar on said shaft, means for contracting said collar on said sleeve and said sleeve on said shaft, a driving rim secured on said collar and having a plain cylindrical surface for engagement with a flat drive belt, said collar being of less axial length than the sleeve whereby the axial position of the rim can be adjusted by moving the collar axially along the sleeve to the desired position, said collar having a tapered end portion, said rim having an inner disc-like flange provided with a central opening, the edge of said opening engaging against the tapered portion of said collar, and means for pressing the flange on said tapered portion to center the rim with respect to the axis of rotation and aid in pressing the collar on said sleeve and the sleeve on the shaft.

8. In rotary power transmission mechanism of the class described, a rotary shaft, a split sleeve on said shaft adapted to frictionally drivingly engage the shaft when contracted thereon, a split collar on said shaft, means for contracting said collar on said sleeve and said sleeve on said shaft, a driving rim secured on said collar and having gear teeth thereon for transmitting the drive, said collar being of less axial length than the sleeve whereby the axial position of the rim can be adjusted by moving the collar axially along the sleeve to the desired position, said collar having a tapered end portion, said rim having an inner disc-like flange provided with a central opening, the edge of said opening engaging against the tapered portion of said collar, and means for pressing the flange on said tapered portion to center the rim with respect to the axis of rotation and aid in pressing the collar on said sleeve and the sleeve on the shaft.

9. A rotary power transmission apparatus comprising a rotary stub shaft extending from an engine housing, a longitudinally split sleeve on said shaft, the length of said sleeve being substantially equal to but not longer than the extending portion of the shaft so that the sleeve does not extend beyond the outer end of the shaft, said sleeve being adapted to frictionally drivingly engage the shaft when contracted thereon, a split collar on said shaft, means for contracting said collar on said sleeve and thereby the sleeve on said shaft, and a driving rim secured on said collar, said collar being of less axial length than the sleeve whereby the axial position of the rim can be adjusted by moving the collar and rim axially along the sleeve to the desired position.

WILLARD R. DAVIS.